(12) United States Patent
Fan et al.

(10) Patent No.: US 11,805,578 B2
(45) Date of Patent: Oct. 31, 2023

(54) MICROWAVE PROCESSING EQUIPMENT FOR CONTINUOUS FLOW LIQUIDS

(71) Applicants: Jiangnan University, Wuxi (CN); Nanjing Xianou Instruments Manufacture Co., Ltd, Nanjing (CN)

(72) Inventors: Daming Fan, Wuxi (CN); Wenhua Gao, Nanjing (CN); Huayu Yang, Wuxi (CN); Hao Zhang, Wuxi (CN); Bowen Yan, Wuxi (CN); Yuhao Zhang, Wuxi (CN); Jianxin Zhao, Wuxi (CN); Wei Chen, Wuxi (CN)

(73) Assignees: JIANGNAN UNIVERSITY, Wuxi (CN); NANJING XIANOU INSTRUMENTS MANUFACTURE CO., LTD, Nanjing (CN)

( * ) Notice: Subject to any disclaimer, the term of this patent is extended or adjusted under 35 U.S.C. 154(b) by 556 days.

(21) Appl. No.: 16/988,787

(22) Filed: Aug. 10, 2020

(65) Prior Publication Data
US 2020/0374994 A1 Nov. 26, 2020

Related U.S. Application Data

(63) Continuation of application No. PCT/CN2019/088566, filed on May 27, 2019.

(30) Foreign Application Priority Data

Jan. 22, 2019 (CN) .......................... 201920107215.1

(51) Int. Cl.
*H05B 6/80* (2006.01)
*H05B 6/78* (2006.01)

(52) U.S. Cl.
CPC ............. *H05B 6/806* (2013.01); *H05B 6/802* (2013.01)

(58) Field of Classification Search
CPC ....... A23C 3/07; A23L 3/01; H05B 2206/045; H05B 6/701; H05B 6/802; H05B 6/806
USPC ....... 219/700, 687, 690, 701, 709, 726, 696, 219/745, 746; 426/241, 244
See application file for complete search history.

(56) References Cited

U.S. PATENT DOCUMENTS

| | | | |
|---|---|---|---|
| 9,860,941 B2 * | 1/2018 | Grandemenge ... | H01J 37/32201 |
| 10,790,118 B2 * | 9/2020 | Kamarehi ............. | H05B 6/686 |
| 2005/0127068 A1 * | 6/2005 | Tang ...................... | H05B 6/704 |
| | | | 219/700 |

FOREIGN PATENT DOCUMENTS

| | | | |
|---|---|---|---|
| CN | 1849846 A | | 10/2006 |
| CN | 201252654 Y | | 6/2009 |
| CN | 201860474 U | | 6/2011 |
| CN | 204275959 U | * | 4/2015 |

(Continued)

*Primary Examiner* — Quang T Van
(74) *Attorney, Agent, or Firm* — IPRO, PLLC

(57) ABSTRACT

The disclosure discloses a microwave processing equipment for continuous flow liquids, and belongs to the technical field of microwave processing. The microwave processing equipment includes a feed preheating section, a microwave heating section and a cooling section. The microwave heating section includes a microwave generation system, a waveguide system, tuners, and a microwave absorption cavity. The waveguide system includes at least two waveguides. Each waveguide is installed at the microwave feed port formed in the outer wall of the microwave absorption cavity according to a predetermined angle greater than or equal to 15° and less than 90°.

14 Claims, 6 Drawing Sheets

(56) References Cited

FOREIGN PATENT DOCUMENTS

| | | | |
|---|---|---|---|
| CN | 106747272 | A | 5/2017 |
| JP | 5769287 | B2 * | 8/2015 |

* cited by examiner

MICROWAVE PROCESSING EQUIPMENT FOR CONTINUOUS FLOW LIQUIDS

TECHNICAL FIELD

The disclosure relates to a microwave processing equipment for continuous flow liquids, and belongs to the technical field of microwave processing.

BACKGROUND

Microwaves refer to electromagnetic waves in a frequency range of 300 MHz-300 GHz. Microwaves have been widely used in the technical field of modern radar and communications. In addition, microwaves have become a new technology in the field of processing due to heating characteristics on dielectric substances. Heating is one of the crucial steps in liquids processing and traditional heating methods usually use steam as a main energy source. For example, in the process of milk pasteurization and UHT sterilization, high-pressure steam consumes a large amount of energy, which has low thermal efficiency and brings many hidden safety risks. Therefore, developing new energy sources to replace steam heating have attracted wide attention all around the world. The microwave heating technology is regarded as one of the most promising industrial heating technologies among novel physical field processing technology.

Compared with traditional thermal processing methods, microwave heating has the following characteristics: 1, short time, fast speed, and strong selectivity; 2, radiant heating, which is not prone to fouling caused by overheating of the tube wall; 3, less energy consumption, compact installation, and high degree of automation; 4, low cost of equipment and accessories, and easy to maintenance. Meanwhile, microwave heating has advantages in maintaining color, aroma, taste and nutrients of raw materials, which has no chemical residues and high in safety. Therefore, it is of great significance to pay attention to the microwave heating technology for the upgrading and optimization of traditional thermal processing.

However, the microwave heating technology is rarely used in continuous flow liquids processing in spite of it has been widely used in household applications. Due to the limited existing technologies and equipment, there is little research on microwave direct heating of continuous flow liquids. The existing design of continuous flow microwave heating equipment for liquids has following problems:

1. The microwave absorption of continuous flow liquids do not match well with the flow characteristics (laminar flow and turbulent flow).
2. The combination of waveguides and resonant cavity only has a conceptually simple connection, and there is no specific feasible solution for continuous flow applications.
3. The different shapes of resonant cavities result in multiple modes and poor stability of microwave inside cavity, which cannot achieve the single-mode absorption process of continuous flow liquids.
4. The problems of efficiency and uniformity of microwave heating are ignored, the energy utilization rate is low, and it is difficult to reach the required temperature of liquids in a limited time.
5. The reflection problem of electromagnetic waves in the cavity is not considered, which may cause many hidden dangers, such as breakdown the magnetrons.
6. The combination equipment for direct microwave heating of continuous flow liquids is rare, and there is a lack of consideration for the rationality of materials for different types of flow liquids.

SUMMARY

In order to solve at least one of the above problems that currently exist, and considering that microwave heating of flow liquids needs to satisfy the following requirements:

1. The fluid must be heated to a required temperature within a certain time and the temperature can be maintained for a certain time;
2. The installation mode of magnetron is rational, and it is necessary to avoid the damage on the magnetron by the reflection of electromagnetic waves while providing sufficient power;
3. The complex electromagnetic field distribution problem must be solved, the cold spot in the equipment must be reduced or eliminated, and need to ensure heating uniformity;
4. The microwave heating process must be stable, and need to ensure that the microwave heating mode matches the fluid flow characteristics;
5. Development of microwave combined equipment, which is suitable for heating continuous flow liquids;

The disclosure provides a microwave processing equipment for continuous flow liquids.

The microwave processing equipment for continuous flow liquids includes: a feed preheating section, a microwave heating section and a cooling section; above sections are connected in sequence.

The microwave heating section includes a microwave generation system, a waveguide system and tuners, and a microwave absorption cavity. The waveguide system includes at least two waveguides. Each waveguide is installed at the microwave feed port formed in the outer wall of the microwave absorption cavity according to a predetermined angle. The predetermined angle is greater than or equal to 15° and less than 90°.

The microwave absorption cavity is a rectangular cavity. The cavity cross-section of each waveguide has the same shape and size as the bottom surface of the microwave absorption cavity. The bottom surface of the microwave absorption cavity is the surface perpendicular to the transmission direction of liquids.

The continuous microwave processing equipment is configured to perform microwave processing on continuous flow liquids.

Optionally, each waveguide is provided with the tuner, and the reflection coefficient during microwave transmission approaches 0 by adjusting the orientation and insertion depth of the tuner.

$$\text{Reflection coefficient} = \frac{\text{reflected voltage}}{\text{incident voltage}}.$$

Optionally, the tuner adopts a single-stub tuner. A network analyzer may be used to measure an input return loss (S11 parameter) during installation. By adjusting the orientation and insertion depth of the tuner, the S11 parameter is less than −10 dB, and the voltage standing wave ratio approaches 1.

$$S11 \text{ parameter} = 20 \lg (\text{reflection coefficient}),$$

$$\text{and voltage standing wave ratio} = \frac{1 + \text{reflection coefficient}}{1 - \text{reflection coefficient}}.$$

Optionally, the predetermined angle ranges from 30° to 60°.

Optionally, inclination directions of the waveguides with respect to a wall surface of the microwave absorption cavity are uniform or partially uniform.

The inclination directions of the waveguides with respect to the wall surface of the microwave absorption cavity are adjusted to be uniform or partially uniform, so that the temperature rise rate of the selected material can meet predetermined requirements.

Optionally, the microwave absorption cavity further includes a material carrying pipeline therein.

Optionally, the material carrying pipeline is a circular pipe.

Optionally, the outer diameter of the material carrying pipeline is same as the inner distance of the short side of the microwave absorption cavity.

Optionally, a device for rapid temperature rising is disposed at the inlet of the material carrying pipeline, and the device is used to make the material quickly heat up to meet the required temperature rising rate when entering the material carrying pipeline.

Optionally, a wave absorbing material is disposed outside the inlet of the material carrying pipeline, and the wave absorbing material is used to make the material quickly heat up to meet the required temperature rising rate when entering the material carrying pipeline.

Optionally, the outer diameter of the material carrying pipeline where with the wave absorbing material is same as the outer diameter of the material carrying pipeline where without the wave absorbing material.

Optionally, a sealing material is installed at the microwave feed port, and the sealing material has a carrying capacity and good microwave permeability, and belongs to low-loss or non-loss insulator.

Optionally, the sealing material includes quartz, polytetrafluoroethylene, polypropylene, and high-temperature resistant glass.

Optionally, the inclination direction of each waveguide with respect to the wall surface of the microwave absorption cavity is toward the middle part of the microwave absorption cavity.

Optionally, the microwave absorption cavity is a rectangular cavity, microwave feed ports are formed in opposite wall surfaces of the microwave absorption cavity with a certain distance, and each waveguide is connected with the microwave absorption cavity by the microwave feed port.

Optionally, the microwave feed ports in adjacent wall surfaces of the microwave absorption cavity are in a 90° rotation relationship.

Optionally, the microwave feed ports in adjacent wall surfaces of the microwave absorption cavity are arranged in a cross manner.

Optionally, the microwave feed ports are formed in each wall surface of the microwave absorption cavity with equal intervals.

Optionally, the microwave feed ports in four wall surfaces of the microwave absorption cavity are arranged spirally.

Optionally, the microwave generation system includes a magnetron, a cooling device and a cast aluminum excitation cavity. One end of the magnetron is connected with the cast aluminum excitation cavity and the other end is connected with the cooling device. The cooling device includes an air cooling and/or water cooling device. The air cooling device includes an axial fan and a fan cover for heat dissipation of the magnetron. The dustproof plate for preventing foreign matters from entering the excitation cavity is disposed at the joint between the cast aluminum excitation cavity and the waveguide system. The water cooling device includes a water cooling container and a circulating water pipeline.

Optionally, the feed preheating section includes a feed tank. The material is conveyed between the feed tank and the microwave heating section through a screw pump. A flow meter is disposed in front of the microwave heating section and configured to accurately control the flow rate of liquids entering the microwave heating section. The feed tank is provided with jacket structure, and hot water with a predetermined temperature is provided in the jacket for heating the liquid material in the feed tank to the preheating temperature. The liquid materials are evenly stirred to improve the heating speed and uniformity, and also make all parts have the same initial temperature.

Optionally, the microwave processing equipment for continuous flow liquids further includes a constant temperature processing section. The constant temperature processing section is connected between the microwave heating section and the liquids cooling section. The constant temperature processing section includes a heat preservation tank, a heating device and a helix tube. The heat preservation tank has a double-layer structure. The helix tube is installed in the heat preservation tank to increase the heat exchange area of the liquids while ensuring sufficient processing time for liquids under a constant temperature. A drain valve is installed at the bottom of the heat preservation tank for liquids drainage and replacement. An air vent is provided at the top cover of the heat preservation tank to balance the internal and external air pressure.

Optionally, the liquids cooling section includes a cooling tank, a refrigerating compressor and a helix tube. The helix tube is installed in the cooling tank and configured to ensure sufficient liquid cooling time and increase the heat exchange area of liquids. The drain valve is installed at the bottom of the cooling tank. The air vent is provided at the top cover of the heat preservation tank to balance the internal and external air pressure.

Optionally, a glass tube is added at the outlet of the microwave heating section to observe the flow state of the fluid material to realize the control of parameters. Meanwhile, a material receiving valve is installed at the outlet of the microwave heating section to change the flow direction of the material to realize flexible material taking.

The beneficial effects of the disclosure are as follows:

Each waveguide is connected with the wall surface of the microwave absorption cavity at a predetermined angle that is greater than or equal to 15° and less than 90°, the area of intersection interface between the waveguide and the material pipeline can be adjusted rationally, and due to the use of the tuners, the reflection coefficient during microwave transmission approaches 0, and the voltage standing wave ratio approaches 1, so that the safety of the microwave processing operation process is greatly improved. The microwave absorption cavity is a rectangular cavity, the microwave feed ports are formed in the opposite wall surfaces of the microwave absorption cavity with a certain distance, each waveguide is connected with the microwave absorption cavity through the microwave feed port, and a specific and feasible solution is provided for microwave processing. The inclination directions of the waveguides with respect to the wall surface of the microwave absorption cavity are set to be uniform or partially uniform, so that uniform output or centralized output of microwave energy conveyed into the microwave absorption cavity can be achieved, and specific and feasible solutions are provided for each case. One solution is a microwave processing equipment for continuous flow liquids, which includes a material transmission pipeline inside the microwave absorption cavity. In this solution, flow liquids circulate from the material transmission pipeline. Another solution is a microwave processing equipment for continuous flow liquids, which does not include a material circulation pipeline inside the microwave absorption cavity. In this solution, a sealing material is installed at each microwave feed port, and flow liquids directly circulate from the microwave absorption cavity. The disclosure take full account of the problem of efficiency and uniformity of microwave heating, the utilization rate of energy is improved, it can reach the treatment temperature of the material and effectively solve the fouling problems caused by the traditional heating processes that use high temperature steam as heat source, such as milk UHT sterilization process.

BRIEF DESCRIPTION OF FIGURES

FIG. 4A is a schematic diagram of the location of materials in the schematic structural diagram I of the microwave heating section. FIG. 4B is a schematic diagram of the location of materials in the schematic structural diagram II of the microwave heating section.

FIG. 6A corresponds to the schematic structural diagram I of the microwave heating section. FIG. 6B corresponds to the schematic structural diagram II of the microwave heating section.

FIG. 7A corresponds to the schematic structural diagram I of the microwave heating section. FIG. 7B corresponds to the schematic structural diagram II of the microwave heating section.

In the above drawings, 101—waveguide, 102—microwave absorption cavity, 103—material carrying pipeline, 104—material, 105—wave absorbing material, and 106—quartz glass.

1—feed preheating section, 2—microwave heating section, 3—constant temperature processing section, 4—cooling section, 5—feed tank, 6—heat preservation jacket, 7—stirring paddle, 8—screw pump, 9—electronic power supply, 10—flow meter, 11—electric heating tube, 12—heat preservation tank, 13—cooling tank, 14—helix tube, 15—refrigerating compressor, 16—ball valve, 17—connecting pipe, 18—upper plate of E—plane waveguide, 19—side plate of E—plane waveguide, 20—lower plate of E—plane waveguide, 21—side plate I of microwave absorption cavity A, 22—tuner, 23—waveguide flange, 24—cover plate of tuner, 25—side plate II of microwave absorption cavity A, 26—quartz glass tube, 27—wave absorbing material, 28—rapid connecting pipe, 29—axial fan, 30—fan cover, 31—cast aluminum excitation cavity, 32—magnetron, 33—microwave absorption cavity flange, 34—silicone rubber sealing O-ring, 35—rapid connecting pipe flange, 36—PTFE backing plate, 37—side plate of H—plane waveguide, 38—lower plate of H—plane waveguide, 39—upper plate of H—plane waveguide, 40—side plate III of microwave absorption cavity A, 41—dustproof plate, 42—side plate IV of microwave absorption cavity A, 43—square/circular transition pipe, 44—side plate I of microwave absorption cavity B, 45—quartz glass for sealing waveguide feed port, 46—sealing flange, 47—side plate II of microwave absorption cavity B, 48—upper plate of E—plane waveguide B, 49—side plate of E—plane waveguide B, 50—lower plate of E plane waveguide B, 51—fixing flange of waveguide—microwave absorption cavity, 52—special flange fixing screw, 53—silicone rubber backing plate, 54—quartz glass frame plate, 55—upper plate of H—plane waveguide B, 56—lower plate of H—plane waveguide B, 57—side plate of H—plane waveguide B, 58—side plate III of microwave absorption cavity B, 59—side plate IV of microwave absorption cavity B.

DETAILED DESCRIPTION

To make the objectives, technical solutions and advantages of the disclosure clearer, the examples of the disclosure will be described in further detail below with reference to the accompanying drawings.

Example 1

Figure 1:
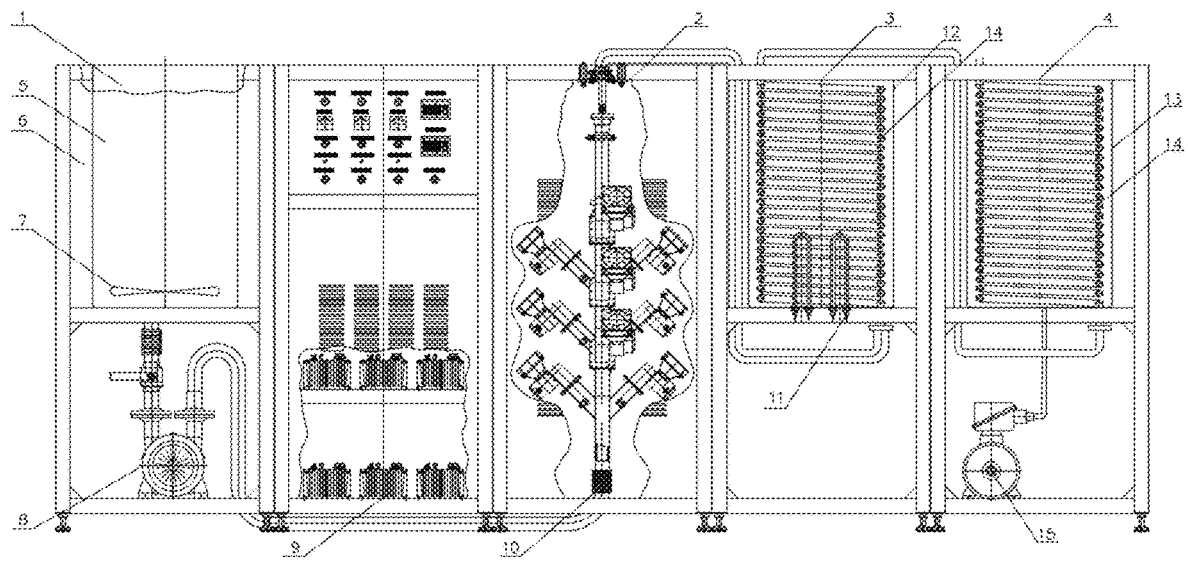
FIG. 1 is a schematic diagram of the microwave processing equipment for continuous flow liquids according to the disclosure.

The present example provides a microwave processing equipment for continuous flow liquids. Referring to FIG. 1, the microwave processing equipment for continuous flow liquids provided by the present example may be applied to microwave processing of fluid materials, and may perform microwave processing on continuous flow fluid materials.

In FIG. 1, 1 represents feed preheating section, 2 represents microwave heating section, 3 represents constant temperature processing section, 4 represents cooling section, 5 represents feed tank, 6 represents heat preservation jacket, 7 represents stirring paddle, 8 represents screw pump, 9 represents electronic power supply, 10 represents flow meter, 11 represents electric heating tube, 12 represents heat preservation tank, 13 represents cooling tank, 14 represents helix tube, and 15 represents refrigerating compressor.

During the actual microwave processing, the purpose of microwave processing cannot be achieved sometimes within a period of time when only the microwave heating section 2 is used to perform microwave processing on fluid materials. For example, during microwave sterilization of milk, high-temperature processing may be required to last for a long time, so it is also necessary to maintain the high temperature for a period of time after the microwave heating section 2 performs microwave processing on milk. Therefore, in the present example, the microwave processing equipment for continuous flow liquids including four parts, a feed preheating section 1, a microwave heating section 2, a constant temperature processing section 3 and a cooling section 4 are taken as an example for description. The constant temperature processing section 3 is used to maintain fluid materials at a high temperature for a period of time after microwave processing to achieve the purpose of sterilization. If the purpose of microwave processing of a certain fluid material can be achieved with microwave processing only performed by the microwave heating section 2, the microwave processing equipment for continuous flow liquids may include only three parts: a feed preheating section 1, a microwave heating section 2 and a cooling section 4.

In the present example, as shown in FIG. 1, the feed preheating section 1, the microwave heating section 2, the constant temperature processing section 3 and the cooling section 4 are connected in sequence. The fluid material flows through the feed preheating section 1, the microwave heating section 2, the constant temperature processing section 3 and the cooling section 4 to complete the entire microwave processing process.

The feed preheating section 1 includes a feed tank 5. The material is conveyed between the feed tank 5 and the microwave heating section 2 through a screw pump 8. Meanwhile, in order to accurately control the flow rate of flow liquids entering the microwave heating section 2, the flow meter 10 may be disposed in front of the microwave heating section 2. The feed tank 5 is structured as a jacket. That is, the feed tank 5 is placed in a heat preservation jacket 6, and the heat preservation jacket 6 is filled with hot water with a predetermined temperature for heating the flow liquids in the feed tank 5 to the preheating temperature. The flow liquids are uniformly stirred to make various parts of the flow liquids in the feed tank 5 have the same initial temperature while improving heating speed and uniformity.

The microwave heating section 2 includes a microwave generation system, a waveguide system, tuners, and a microwave absorption cavity.

The microwave generation system is composed of a magnetron 32, a cooling device and a cast aluminum excitation cavity 31. The magnetron 32 is selected according to actual needs. One end of the magnetron 32 is connected with the cast aluminum excitation cavity 31 and the other end is connected with the cooling device. The cooling device includes an air cooling and/or water cooling device. The air cooling device is composed of an axial fan 29 and a fan cover 30 for heat dissipation of the magnetron 32 during use, so as to enable the microwave generation system to maintain at a normal working state. A dustproof plate 41 is disposed at a joint between the cast aluminum excitation cavity 31 and the waveguide system, can be used for preventing foreign matters such as dust from entering the cast aluminum excitation cavity 31, and plays a role in guiding air and a certain heat dissipation effect. The water cooling device includes a water cooling container and a circulating water pipeline. In the present example and the following examples, the air cooling device is used as an example for description, so the water cooling device will not be described in detail here.

Considering that the single microwave mode can improve the energy stability, in order to effectively reduce electromagnetic wave modes inside the microwave absorption cavity 102, the length and width dimensions of a bottom surface of the microwave absorption cavity 102 (that is, a face perpendicular to a material transmission direction) are designed to be the same as the cross-sectional length and width dimensions of the cavity of rectangular waveguide 101 used in this application. Therefore, in the present example, the microwave absorption cavity 102 being a rectangular cavity is taken as an example for description, and the length and width dimensions of a bottom surface of the microwave absorption cavity 102 (that is, a face perpendicular to a material transmission direction) are the same as the cross-sectional length and width dimensions of the cavity of rectangular waveguide 101 used.

If single-mode microwaves are not required, the microwave absorption cavity 102 may also be designed as a cavity of other shapes according to actual needs.

The waveguide system is composed of a plurality of rectangular waveguides 101 arranged in a staggered manner. A microwave feed port is formed in the outer wall of the microwave absorption cavity 102. For convenience of description, adjacent wall surfaces among four wall surfaces of the microwave absorption cavity 102 are respectively marked as an E plane and an H plane, that is, the microwave absorption cavity 102 has two E planes and two H planes.

Figure 2:
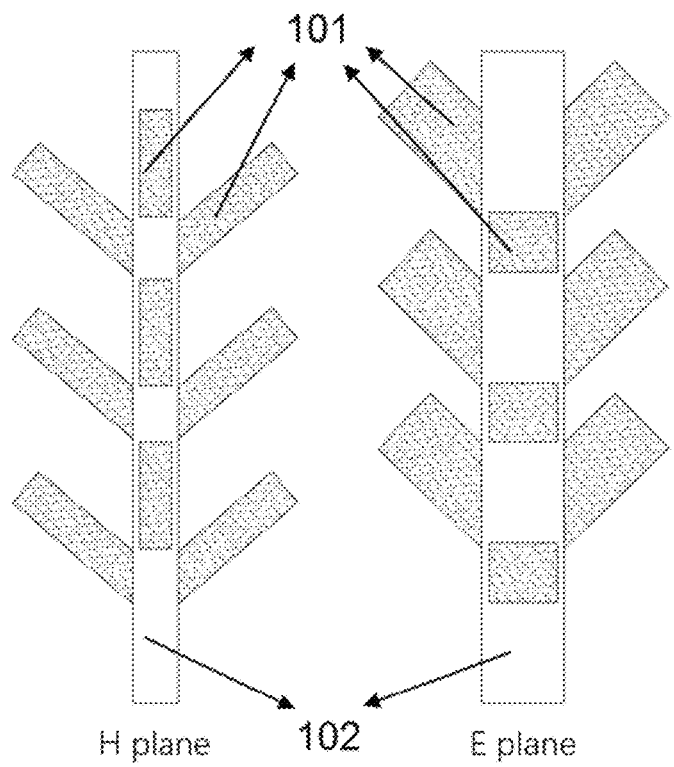
FIG. 2 is a schematic structural diagram I of the microwave heating section.
Figure 3:
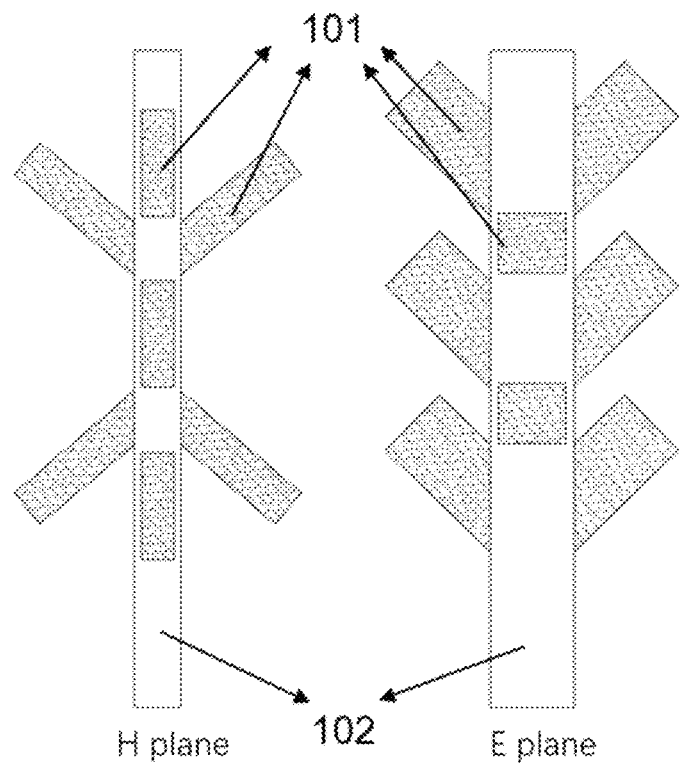
FIG. 3 is a schematic structural diagram II of the microwave heating section.

A corresponding pair of microwave feed ports is formed in the two E planes at a certain interval, a corresponding pair of microwave feed ports is formed in the two H planes at a certain interval, and the pair of microwave feed ports in the E plane is just located at an intermediate position of the microwave feed port in the H plane in a Z direction. The microwave feed ports in the E plane and the H plane have a 90° rotation relationship. As shown in FIG. 2 and FIG. 3, each waveguide 101 is connected with the microwave absorption cavity 102 through the corresponding microwave feed port, and each waveguide 101 is connected with the microwave absorption cavity 102 through external laser welding to ensure that inner walls of the microwave absorption cavity 102 and the waveguide 101 are smooth, which provides a guarantee for the uniform distribution of electromagnetic waves, avoids excessive reflection of the electromagnetic waves, and prevents damage to the microwave generation system.

(It should be noted that the above arrangement of the microwave feed ports is not unique. In practical applications, various factors can be taken into consideration to determine the arrangement of the microwave feed ports according to actual needs, such as spiral-up arrangement.)

The above arrangement of the microwave feed ports enables microwave energy to be continuously transmitted to the flow liquids, reduces heating cold spots in the microwave absorption cavity 102, and improves the liquid heating efficiency. Meanwhile, each rectangular waveguide 101 is connected with the feed port in the wall surface of the microwave absorption cavity 102 at a predetermined angle of less than 90° and greater than 15°, so that the electromagnetic waves can be effectively prevented from being reflected back into a waveguide cavity or entering an opposite waveguide after being output, and the operation safety is greatly improved.

Each waveguide 101 is provided with the tuner 22, and the reflection coefficient during microwave transmission approaches 0 by adjusting orientation and insertion depth of the tuner.

$$\text{Reflection coefficient} = \frac{\text{reflected voltage}}{\text{incident voltage}}.$$

The tuner 22 may adopt a single-stub tuner. During the debugging of the continuous microwave processing equipment, network analyzer is used to measure S11 parameters. By adjusting the orientation and insertion depth of the tuner 22 in the waveguide, S11<−10 dB, and the voltage standing wave ratio approach to 1, so that the microwave reflection is minimized, microwave energy is promoted to gather in the microwave absorption cavity, the possibility of reflected waves penetrating the magnetron is further reduced, the magnetron is protected and the service life of the equipment is prolonged, provided guarantee for the normal and safe operation of the equipment, the energy utilization efficiency of microwaves is improved, and the number of cold spots in the microwave heating section is reduced.

$$S11 \text{ parameter} = 20 \lg \text{ (reflection coefficient)},$$

$$\text{and voltage standing wave ratio} = \frac{1 + \text{reflection coefficient}}{1 - \text{reflection coefficient}}.$$

In practical applications, the diameter of the above tuner 22 ranges from 10 to 30 mm and the insertion depth ranges from 10 to 60 mm. The adjustable front-back and insertion depth ranges of the tuner 22 are all at a quarter wavelength or above. The tuner 22 may be made of metal materials such as stainless steel.

In practical applications, a quartz glass tube is added at an outlet of the microwave heating section 2 to observe a flow state of fluid materials to facilitate the control over parameters. Meanwhile, a material receiving valve is installed at the outlet of the microwave heating section 2. The flow direction of materials can be changed by changing the connection condition of the material receiving valve so as to realize flexible material taking.

The constant temperature processing section 3 is composed of a heat preservation tank 12, an electric heating device and a helix tube 14. The heat preservation tank 12 is of a double-layer structure, which plays a better heat preservation role, and also avoids the hidden safety hazards caused by excessive temperature. The helix tube 14 is installed inside the heat preservation tank 12 to ensure a sufficient liquid constant temperature processing time while increasing a liquid heat exchange area, so that liquids meet the required sterilization requirements. The electric heating device is a stainless steel electric heating tube 11, the power and the number are selected according to actual situations, and a drain valve is installed at the bottom of the heat preservation tank 12 to facilitate liquid drainage and liquid replacement. An upper portion of the heat preservation tank 12 is provided with a top cover. An air outlet hole is formed in the top cover, and is mainly used to prevent the safety problem caused by excessive steam pressure in the tank.

(It should be noted that the continuous microwave processing equipment may not include the constant temperature processing section 3, for example, if the heat treatment requirements have been completed in the microwave heating section 2 or the treatment process does not require constant temperature, the constant temperature processing section 3 may not be included.)

The cooling section 4 is composed of a cooling tank 13, a refrigerating compressor 15 and a helix tube 14. The helix tube 14 is installed in the cooling tank 13 to ensure a sufficient liquid cooling time while increasing a liquid heat exchange area. The rapid temperature drop also helps in certain processing processes (for example, during the flow liquid sterilization process, it helps to kill residual microorganisms in liquids, so that the liquids further meet sterilization requirements). The refrigerating compressor 15 is selected according to the flow rate of a temperature drop fluid, and a drain valve is installed at the bottom of the cooling tank 13. An upper portion of the cooling tank 13 is provided with a top cover. An air outlet hole is formed in the top cover, and is mainly used to balance internal and external air pressures and ensure the safe operation of the equipment.

In practical applications, flow liquids may be directly conveyed from the feed tank 5 to the microwave heating section 2 via the screw pump 8 and subjected to continuous heat treatment in the microwave absorption cavity 102. After heat treatment, the materials enter the constant temperature processing section 3 and the cooling section 4 in sequence according to heat treatment requirements.

The microwave heating section 2 of the microwave processing equipment for continuous flow liquids provided by the disclosure has two different structures. For convenience of description, they are respectively denoted as structure I and structure II, and are described respectively in Example 2 and Example 3.

Example 2

In the present example, the microwave absorption cavity further includes a material carrying pipeline therein, and materials circulate from the material carrying pipeline. The details are described below.

Figure 4A:
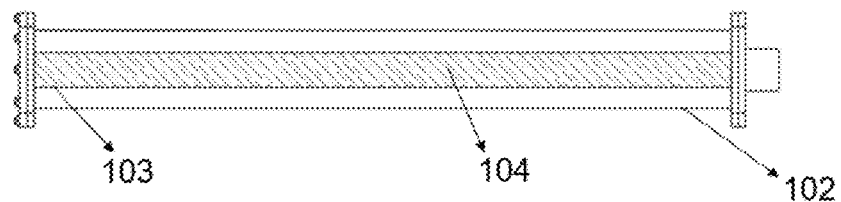
FIG. 4A-4B is a schematic diagram of the location of materials in two structures of the microwave heating section.
Figure 4B:
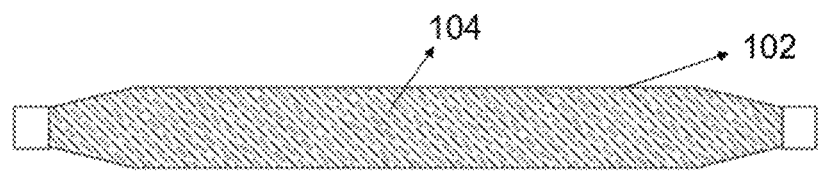

Referring to FIG. 4A-4B, FIG. 4A is a schematic diagram of the location of materials corresponding to the structure I. As can be seen from FIG. 4A, the microwave absorption cavity 102 of the microwave heating section 2 in the structure I further includes a material carrying pipeline 103. The materials circulate from the material carrying pipeline 103. The material carrying pipeline 103 is made of a material with good microwave permeability and a certain carrying capacity. The material with the good microwave permeability includes quartz, polytetrafluoroethylene, polypropylene, high-temperature resistant glass, and the like.

Figure 5:
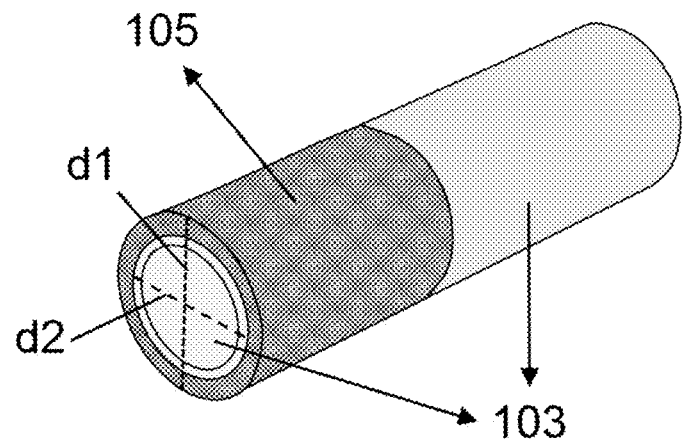
FIG. 5 is a schematic structural diagram of the inlet of the material carrying pipeline in the schematic structural diagram I of the microwave heating section.
Figure 6A:
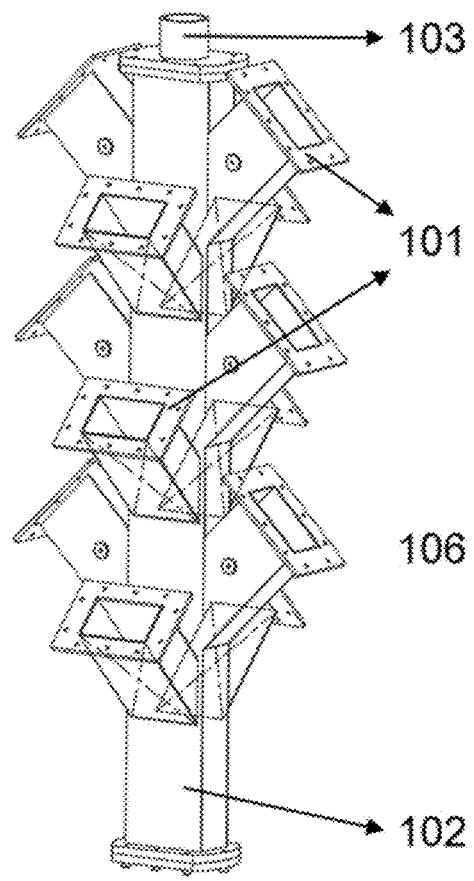
FIG. 6A-6B is a schematic diagram of installation structures corresponding to the waveguide system and the microwave absorption cavity in two structures of the microwave heating section respectively.
Figure 6B:
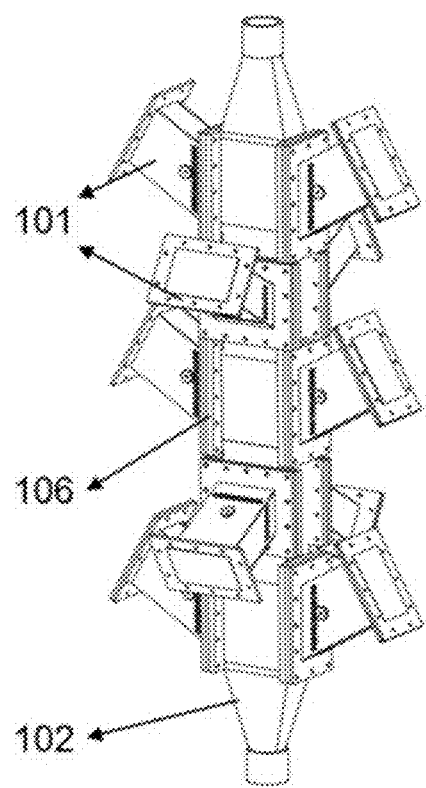
Figure 7A:
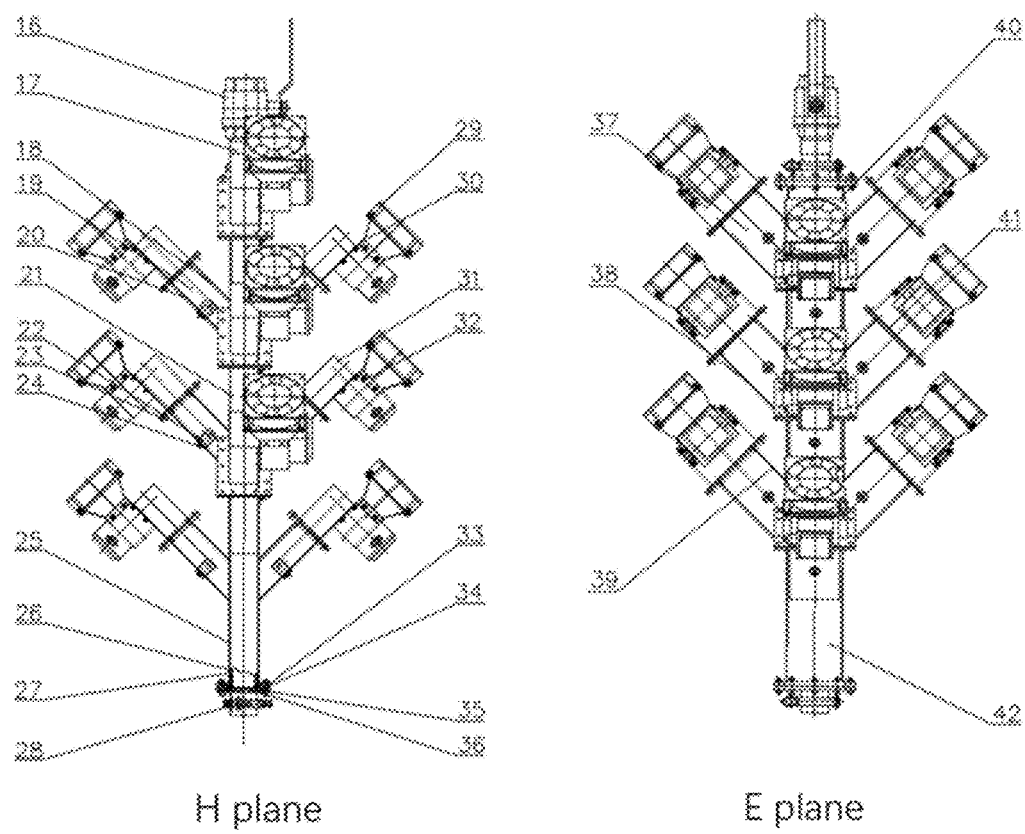
FIG. 7A-7B is a schematic diagram of overall installation structures of two structures of the microwave heating section respectively.
Figure 7B:
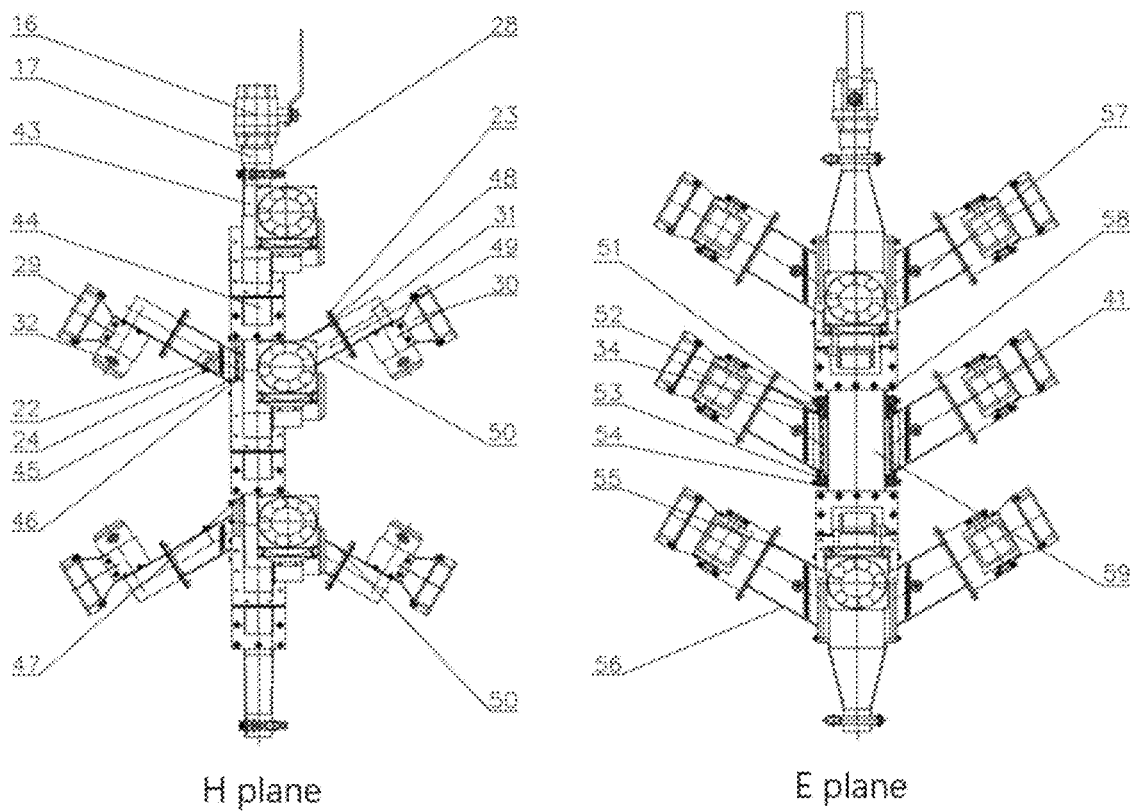

If the microwave processing equipment for continuous flow liquids is used for flow liquid sterilization, in order to achieve a temperature rise rate required by liquid sterilization, which requires, for example, that the temperature of the flow liquids needs to rise by N° C. within a period of time, the solution of the structure I is as follows:

For the structure I: referring to FIG. 5, a wave absorbing material is disposed outside the inlet of the material carrying pipeline 103, and the wave absorbing material is configured to allow, when a material enters the material carrying pipeline 103, the temperature to rise rapidly to meet set temperature rise rate requirements.

There are various implementation schemes for providing the wave absorbing material outside the inlet of the material carrying pipeline 103. In one of the implementation schemes, the wave absorbing material is added directly outside a section at the inlet of the material carrying pipeline 103. The scheme may be implemented by changing the wall thickness of the section at the inlet of the material carrying pipeline 103 to add the wave absorbing material. For example, as shown in FIG. 5, the outer diameter d1 or the inner diameter d2 of the material carrying pipeline 103 may be changed. In the present example, a constrained diameter design scheme that keeps d1 unchanged is adopted. Another implementation manner is implemented by changing a material of a section at the inlet of the material carrying pipeline 103. For example, the material carrying pipeline 103 adopts a quartz pipeline, so that when preparing the section at the inlet of the material carrying pipeline 103, the wave absorbing material is added to obtain a material having a wave absorbing function, and the material is used to prepare the section at the inlet of the material carrying pipeline 103.

In the above constrained diameter design scheme, the length of a constrained diameter may be adjusted according to the distance between the inlet of the material carrying pipeline 103 and the first microwave feed port. For example, if the distance from the microwave feed port is long, the length of the constrained diameter portion may be increased accordingly. The length of the constrained diameter should be adjusted according to actual situations and demands. If the temperature of the material needs to rise rapidly, the length of the constrained diameter should be appropriately increased, that is, the added wave absorbing materials are increased, so that heat is more concentrated and quickly transferred to the material. The constrained diameter design scheme not only facilitates the connection of the material carrying pipeline 103 and an external pipeline, but also facilitates the process of installation and disassembly, and helps to seal the material carrying pipeline 103 and effectively prevent microwave leakage.

Example 3

In the present example, the microwave absorption cavity does not additionally include a material carrying pipeline therein, and materials circulate from the microwave absorption cavity directly. The details are described below.

Referring to FIG. 4A-4B, FIG. 4B is a schematic diagram of a location of materials corresponding to the structure II. As can be seen from FIG. 4B, the materials circulate from the interior of the microwave absorption cavity 102 directly, so that the microwave feed port in the wall surface of the microwave absorption cavity 102 of the microwave heating section 2 in the structure II is sealed by using a sealing material. The sealing material has good microwave permeability and a certain carrying capacity, includes quartz, polytetrafluoroethylene, polypropylene, high-temperature resistant glass, and the like, and may be used by stacking one or more materials.

If the microwave processing equipment for continuous flow liquids adopting this structure is used for flow liquid sterilization, in order to achieve a temperature rise rate required by liquid sterilization, which requires, for example, that the temperature of the flow liquids needs to rise by N° C. within a period of time, the solution of the structure II is as follows:

For the structure II, as shown in FIG. 3, because the materials circulate from the interior of the microwave absorption cavity 102 directly, the above temperature rise rate requirements may be met by adjusting the inclination direction of the waveguide on the E planes and/or the H planes with respect to the wall surface of the microwave absorption cavity 102. Specifically, the waveguides on the two E planes may be adjusted toward the intermediate position of the microwave absorption cavity 102, while keeping the inclination direction of the waveguides on the two H planes unchanged, as shown in FIG. 3, so as to realize centralized output of microwave energy conveyed into the microwave absorption cavity 102 to an intermediate part thereof, and therefore the materials therein may realize rapid temperature rise to achieve the temperature rise rate required for liquid sterilization.

It should be noted that the inclination direction of each waveguide in the above waveguide system may be adjusted according to actual needs. For example, the inclination direction of any waveguide, not limited to a waveguide on the E plane or the H plane, may be adjusted to be toward one direction.

When the microwave processing equipment for continuous flow liquids provided in Examples 1 to 3 of the disclosure processes fluid materials, when the flow liquids flow through the microwave absorption cavity 102 or the material carrying pipeline 103 therein from bottom to top, a lower end of the microwave absorption cavity is connected and fixed by a flange 33. A tetrafluoro backing plate 36 and a silicone rubber O-ring 34 are added between an inlet end of the microwave absorption cavity 102 or the material carrying pipeline 103 therein and the flange 33 to ensure the tightness and prevent microwave leakage. Meanwhile, the microwave absorption cavity 102 or the material carrying pipeline 103 therein is connected with an external pipeline using a rapid connecting pipe 28, and fixed by a rapid connecting pipe flange 35. In the food industry, the external pipeline may be selected from stainless steel 316 and 316L.

In the disclosure, by mainly using the thermal effect of microwave, the temperature of the materials in the cavity of the microwave system rises rapidly and reaches a required processing temperature by the special design of the microwave heating section. In conjunction with the constant temperature and cooling sections, the temperature and time of the processing process are further ensured, and continuous microwave heating of the flow liquids is achieved.

The above are only preferred examples of the disclosure and are not intended to limit the disclosure. Any modification, equivalent replacement, improvement, and the like made within the spirit and principle of the disclosure should be included in the scope of protection of the disclosure.

What is claimed is:

1. A microwave processing equipment for continuous flow liquid, comprising: a feed preheating section, a microwave heating section and a cooling section;
   wherein the microwave heating section comprises a microwave generation system, a waveguide system, tuners, and a microwave absorption cavity, the waveguide system comprises at least two waveguides, each waveguide is installed at a microwave feed port formed in an outer wall of the microwave absorption cavity according to a predetermined angle, and the predetermined angle is greater than or equal to 15° and less than 90°;
   the microwave absorption cavity is a rectangular cavity, a cavity cross-section of each waveguide has the same shape and size as a bottom surface of the microwave absorption cavity, and the bottom surface of the microwave absorption cavity is a surface perpendicular to a material transmission direction; and
   the microwave processing equipment is configured to perform microwave processing on the continuous flow liquid.

2. The microwave processing equipment according to claim 1, wherein each waveguide is provided with a tuner, and a reflection coefficient during microwave transmission approaches 0 and a voltage standing wave ratio approaches 1 by adjusting orientation and insertion depth of the tuner.

3. The microwave processing equipment according to claim 2, wherein the predetermined angle ranges from 30° to 60°.

4. The microwave processing equipment according to claim 1, wherein inclination directions of the waveguides with respect to a wall surface of the microwave absorption cavity are uniform or partially uniform or different.

5. The microwave processing equipment according to claim 4, wherein the microwave absorption cavity further comprises a material carrying pipeline therein.

6. The microwave processing equipment according to claim 5, wherein a rapid temperature rise device is disposed at an inlet of the material carrying pipeline, and the rapid temperature rise device is configured to allow, when a material enters the material carrying pipeline, a temperature to rise rapidly to meet set temperature rise rate requirements.

7. The microwave processing equipment according to claim 6, wherein a wave absorbing material is disposed outside the inlet of the material carrying pipeline, and the wave absorbing material is configured to allow, when a material enters the material carrying pipeline, the temperature to rise rapidly to meet the set temperature rise rate requirements.

8. The microwave processing equipment according to claim 7, wherein an outer diameter of the inlet of the material carrying pipeline is the same as an outer diameter of a pipeline part of the material carrying pipeline not provided with the wave absorbing material.

9. The microwave processing equipment according to claim 4, wherein a sealing material is installed at a microwave feed port, the sealing material is located between each waveguide and the microwave absorption cavity, and the sealing material has a carrying capacity and good microwave permeability, and belongs to low-loss or non-loss insulators.

10. The microwave processing equipment according to claim 9, wherein the inclination direction of each waveguide with respect to the wall surface of the microwave absorption cavity is toward a middle part of the microwave absorption cavity.

11. The microwave processing equipment according to claim 10, wherein the microwave generation system comprises a magnetron, a cooling device and a cast aluminum excitation cavity, one end of the magnetron is connected with the cast aluminum excitation cavity and the other end is connected with the cooling device, the cooling device comprises an air cooling and/or water cooling device, the air cooling device comprises an axial fan and a fan cover for heat dissipation of the magnetron, a dustproof plate for preventing foreign matters from entering the cast aluminum excitation cavity is disposed at a joint between the cast aluminum excitation cavity and the waveguide system, and the water cooling device comprises a water cooling container and a circulating water pipeline.

12. The microwave processing equipment according to claim 11, wherein the feed preheating section comprises a feed tank, the material is conveyed between the feed tank and the microwave heating section through a screw pump, a flow meter is disposed in front of the microwave heating section and configured to accurately control a flow rate of flow liquid entering the microwave heating section, the feed tank is structured as a jacket being filled with hot water with a predetermined temperature for heating the flow liquid in the feed tank to a preheating temperature, and the flow liquid is uniformly stirred to make various parts thereof have the same initial temperature while improving heating speed and uniformity.

13. The microwave processing equipment according to claim 12, further comprising: a constant temperature processing section connected between the microwave heating section and the cooling section, wherein the constant temperature processing section comprises a heat preservation tank, a heating device and a helix tube, the heat preservation tank is of a double-layer structure, the helix tube is installed in the heat preservation tank and configured to ensure a sufficient flow liquid constant temperature processing time while increasing a flow liquid heat exchange area, a drain valve is installed at the bottom of the heat preservation tank for liquid drainage and liquid replacement, and an air outlet hole is formed in a top cover of the heat preservation tank to balance internal and external air pressures.

14. The microwave processing equipment according to claim 13, wherein the cooling section comprises a cooling tank, a refrigerating compressor and a helix tube, the helix tube is installed in the cooling tank and configured to ensure a sufficient liquid cooling time while increasing a flow liquid heat exchange area, a drain valve is installed at the bottom of the cooling tank, and an air outlet hole is formed in a top cover of the cooling tank to balance internal and external air pressures.

* * * * *